J. C. ALDER, Sr.
CHUCK FOR MACHINE TOOLS.
APPLICATION FILED JAN. 15, 1917.

1,231,322. Patented June 26, 1917.

Inventor
Jean Conrad Alder, Sr.
By his Attorney

UNITED STATES PATENT OFFICE.

JEAN CONRAD ALDER, SR., OF CHÂTELAINE, NEAR GENEVA, SWITZERLAND.

CHUCK FOR MACHINE-TOOLS.

1,231,322.   Specification of Letters Patent.   Patented June 26, 1917.

Application filed January 15, 1917. Serial No. 142,357.

*To all whom it may concern:*

Be it known that I, JEAN CONRAD ALDER, Sr., mechanician, a citizen of Switzerland, residing at Châtelaine, near Geneva, in the Confederation of Switzerland, have invented certain new and useful Improvements in and Relating to Chucks for Machine-Tools, of which the following is a specification.

The object of the present invention consists of some new and useful improvements in and relating to chucks for machine tools.

The invention has for its object to facilitate for the workman working at a lathe, boring machine or other machine-tool the fixing to the rotary axle of the machine and the taking off the same of the object to be worked or the tool intended to be used on the said machine.

By means of the present improvements this fixing to and taking off is not only made very easy, but at same time the said object or tool is affixed with much more firmness than it is the case with the means used for the same purpose up to now.

The improvements may be applied to any machine-tool whatever but it will be explained below with reference to a lathe only, of which the annexed drawing shows, by way of example, a portion of the rotative spindle to which a work piece $e$ is to be fixed.

Figure 1:
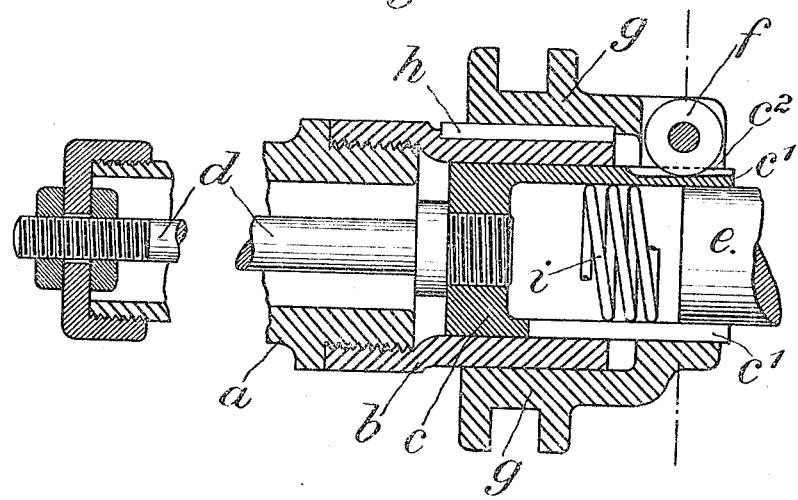
Figure 2:
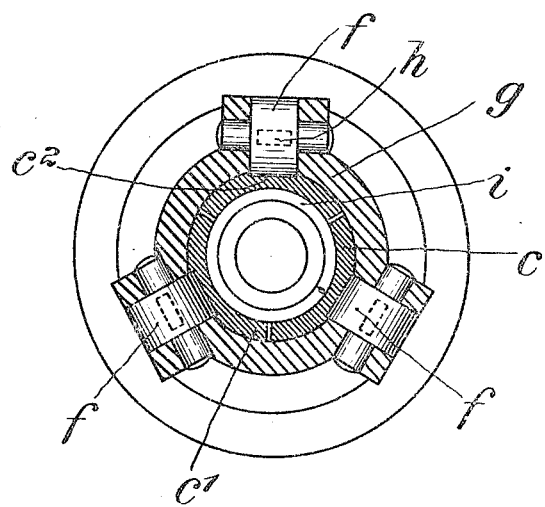

Figure 1 is a longitudinal section and Fig. 2 a cross section on line A—B of Fig. 1.

$a$ is the hollow spindle of a lathe and $b$ a sleeve fixed thereto carrying in its inside a grip $c$ slidingly arranged within said sleeve and fixed to an axial rod $d$ running centrally inside of and along the hollow spindle $a$.

Grip $c$ is formed by a cylindrical piece having its tubular portion splitted open on a part of its length so as to form segments $c^1$ between which the work piece $e$ may be clamped. For this purpose each of the segments is provided with a wedge shaped surface $c^2$ and these wedge shaped surfaces are kept in close contact with friction rollers $f$ mounted on a clamping ring $g$ slidingly adjusted on sleeve $b$. Between this sleeve $b$ and ring $g$ feathers $h$ are fitted to the sleeve so as to prevent the ring from turning on the sleeve without interfering with its sliding movement.

Ring $g$ is also provided with two shoulders between which the prongs of a shifting fork not shown in the drawing may be engaged for shifting the ring so as to press rollers $f$ against the wedge surfaces $c^2$ and to tighten thereby the grip of the segments on the work piece $e$.

A cylindrical spring $i$ may also be lodged within the grip $c$ in order to facilitate the loosening of its grip on the work piece after the return of the friction rollers.

Grip $c$ may be formed with any desired number of segments.

Claims:

1. In chucks for machine tools the combination with a sleeve intended to be fixed to the end of the rotative spindle of the machine tool, of a hollow segmental grip lodged slidingly within said sleeve and provided with a number of wedge-shaped surfaces, of a clamping ring slidingly adjusted on said sleeve, in combination with friction rollers fitted to said ring and intended to roll each on one of the wedge-shaped surfaces of the segmental grip, and means for shifting the ring on the sleeve so as to have the rollers acting on the said wedge surfaces of the grip and to fasten or unfasten the same to or from the work-object, substantially as and for the purpose specified.

2. In chucks for machine tools according to claim 1, the combination of a sleeve $b$ with a hollow grip $c$ formed of a cylindrical piece the tubular portion of which is splitted open on part of its length, each of the segments formed by the splits being provided with a wedge shaped surface $c^2$, in combination with a ring $g$ bearing rollers $f$ intended each to roll upon one of the surfaces $c^2$.

3. In chucks for machine tools according to claim 2, the combination of the grip $c$ with a spring $i$ intended to facilitate the loosening of its grip.

In testimony whereof I have affixed my signature.

JEAN CONRAD ALDER, SR.

Copies of this patent may be obtained for five cents each, by addressing the "Commissioner of Patents, Washington, D. C."